United States Patent
Kataoka

[11] 3,910,826
[45] Oct. 7, 1975

[54] CULTIVATION APPARATUS FOR MICRO-ORGANISMS

[75] Inventor: Akihiko Kataoka, Chigasaki, Japan

[73] Assignees: Dainippon Ink & Chemicals, Inc.; Japan Gasoline Co., Ltd., both of Tokyo, Japan

[22] Filed: Jan. 9, 1974

[21] Appl. No.: 431,936

[30] Foreign Application Priority Data
Jan. 29, 1973  Japan.............................. 48-012211

[52] U.S. Cl. ................. 195/142; 195/139; 195/143
[51] Int. Cl.² ......................................... C12B 1/16
[58] Field of Search ........... 195/109, 139, 142, 140, 195/141, 143

[56] References Cited
UNITED STATES PATENTS
3,717,552  2/1973  Hondermarck et al. ............. 195/142
3,732,148  5/1973  Franckowiak et al. ............. 195/109

*Primary Examiner*—A. Louis Monacell
*Assistant Examiner*—R. B. Penland
*Attorney, Agent, or Firm*—Woodhams, Blanchard and Flynn

[57] ABSTRACT

An apparatus for aerobic cultivation of micro-organisms comprising a bubble column fermentor having a draft tube incorporated in said fermentor, wherein the position of the lowermost end of the draft tube and the position of the gas-distributor are specified and the cultivated liquid drawn out of the bottom of the fermentor is to be circulated to the upper part of the fermentor by a centrifugal pump after being cooled by a heat exchanger.

5 Claims, 1 Drawing Figure

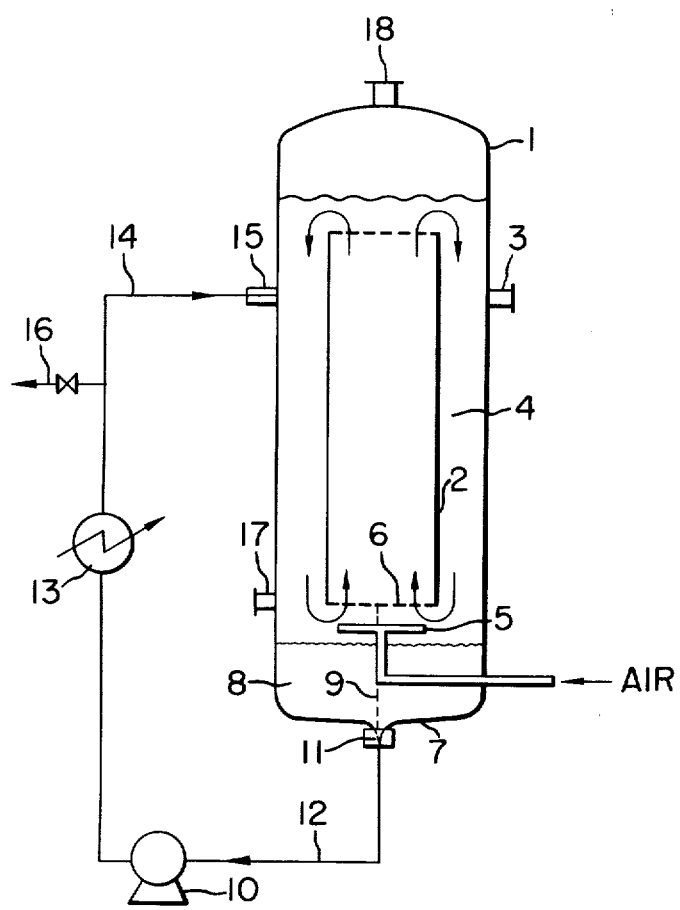

CULTIVATION APPARATUS FOR MICRO-ORGANISMS

BACKGROUND OF THE INVENTION a. Field of the Invention

The present invention relates to an improvement of apparatus for cultivating micro-organisms employing a bubble column fermentor.

b. Description of the Prior Art

As the method of cultivation to produce cells for the purpose of, for instance, hydrocarbon fermentations, there is known a method comprising introducing nutritive elements, such as normal paraffin, into a bubble column fermentor, supplying oxygen to the fermentor by aeration for a fixed time so as to grow micro-organisms, drawing the cultivated liquid containing cells out of the fermentor, separating said cells from the cultivated liquid and discharging the waste liquid from the cultivation system. In this aerobic fermentation method, inasmuch as the minute bubbles of carbon dioxide formed by the respiration of micro-organisms within the fermentor generally circulate inside the fermentor together with the cultivated liquid and at the same time there is generated a large amount of the heat, in order to practice the cultivation of micro-organisms on industrial scale, it is most essential to ensure the suppression of foam which is otherwise generated in large quantities, the efficient removal of the heat of cultivation and a sufficient supply of oxygen to cells. From this point of view, a bubble column fermentor tube consisting of a bubble column having a draft incorporated therein which has been proposed as an apparatus capable of satisfying these requirements collectively is worthy of attention. In other words, a draft tube installed in a fermentor proves to be much more advantageous than, for instance, the conventional fermentor with an agitator in respect of the supply of oxygen to cells and relatively less generation of foam. However, inasmuch as this bubble column fermentor with draft tube is of the so-called internal heat-exchange system having a heat exchanger incorporated in the fermentor, it is defective in that the cost of the equipment is too expensive in the case of applying it to an apparatus of industrial scale and it is hard to repair when it gets out of order, so that it, in fact, has not been of much practical use.

SUMMARY OF THE INVENTION

One object of the present invention is to provide a cultivation apparatus for micro-organisms which accomplishes cultivation of micro-organisms under satisfactory conditions. Another object of the present invention is to provide a cultivation apparatus for micro-organisms which accomplishes cultivation of micro-organisms under satisfactory conditions without resorting to such equipment as a defoamer, a foam breaker and the like.

The inventors, with a view to making the best industrial use of the advantageous features of the conventional bubble column fermentor with draft tube have tried a method designed to dispose the heat exchanger outside the fermentor and cool the cultivated liquid after drawing it out of the fermentor. But, the mere disposition of the heat exchanger outside the fermentor necessitated a defoamer or a foam breaker in order to remove foams from the circulating cultivated liquid, it was necessary to install an expensive special pump such as a gear pump and it was attended with not a few troubles attributable to the additional equipment, so that the result was rather unfavorable. Therefore, the inventors have reexamined their previous attempts, continued their experiments for improvement and discovered that it is possible to cultivate micro-organism very satisfactorily, without installing such additional equipment as a defoamer, gear pump, etc., by applying the process comprising specifying the position of the gas-distributor for introducing and distributing the gas to be located inside a bubble column fermentor with draft tube (no heat exchanger is of course incorporated in this fermentor), forming a gas-liquid separating zone below said gas-distributor, drawing the cultivated liquid passing this gas-liquid separating zone and having a relatively lower content of foam out of the fermentor and sending said cultivated liquid to a heat exchanger outside the fermentor by means of a conventional pump for cooling. The present invention has been accomplished on the basis of this finding.

In other words, the cultivation apparatus for micro-organisms employing a bubble column fermentor with draft tube according to the present invention is characterized in that, the distance between the lowermost end of the draft tube and the bottom of the fermentor is designed to be in the range of one-half to three-halves relative to the diameter of the draft tube, the gasdistributor is to be located above the position as high as two-thirds of the distance between the lowermost end of the draft tube and the bottom of the fermentor, the cultivated liquid drawn out of the bottom of the fermentor is to be sent to a heat exchanger through a centrifugal pump to be cooled thereby, and the thus cooled cultivated liquid is to be circulated into the upper part of the fermentor.

BRIEF DESCRIPTION OF THE DRAWING

The appended drawing is a schematic illustration of an apparatus according to the present invention. In the drawing the reference numeral 1 denotes the fermentor, 2 denotes the draft tube, 3 denotes the inlet for the medium, 5 denotes the gas-distributor, 6 denotes the lowermost end of the draft tube, 7 denotes the bottom of fermentor, 10 denotes the circulating pump, 11 denotes the outlet nozzle for drawing out the cultivated liquid, 13 denotes the heat exchanger, and 15 denotes the inlet nozzle for returning liquid.

DETAILED DESCRIPTION OF THE INVENTION

The present invention as set forth above, provides an apparatus for aerobic cultivation of micro-organisms employing a bubble column fermentor with draft tube, wherein a gas-liquid separating zone is formed below the gas-distributor 5 by specifying the position of said gas-distributor 5 and the position of the lowermost end 6 of the draft tube and the cultivated liquid passed through said gas-liquid separting zone is cooled efficiently and economically outside of said fermentor.

As shown in the appended drawing, the bubble column fermentor with draft tube for use in the present invention consists of a fermentor 1 having a cylindrical draft tube 2 incorporated therein, and is so devised as to make the cultivated liquid 4 fed into the fermentor through the inlet for liquid 3 circulate in the form of a gas-liquid mixture round the draft tube 2 while being agitated by virtue of air or a mixture gas containing oxygen fed in from the gas-distributor 5. As the gas-distributor 5, it will do to employ any of the ordinary perforated plate, porous plate and unifold nozzle. On this occasion, the position of the gas-distributor 5 is to be located between the lowermost end 6 of the draft tube and the bottom 7 of the fermentor, and exact, it is to be located above the position as high as two-thirds of the linear distance 9 between the lowermost end 6 of the draft tube and the bottom 7 of the fermentor because of the necessity for forming a gas-liquid separating zone 8 below the gas-distributor 5 as set forth later on. In the part below this gas-distributor 5, the speed of downward flow of the circulating liquid is relatively slow, so that it is overcome by the speed of upward flow thereof due to the buoyancy of the foam, and as a result, there is formed a gas-liquid separating zone 8, thereby decreasing the bubble-containing ratio of the cultivated liquid in the vicinity of the bottom of fermentor within the gas-liquid separating zone 8 to less than 10% or thereabouts. Accordingly, in the case where the position of the gas-distributor 5 is lower than the aforesaid position, it will affect the gas-liquid separating zone 8 and the bubble-containing ratio of the cultivated liquid drawn out of the bottom of fermentor will become high, giving rise to cavitation in the pump to render it inoperative, so that it is undesirable. In this connection, it also will do to make the position of the gas-distributor 5 higher than the aforesaid position, and it may be located inside the draft tube 2. Further, the lowermost end 6 of the draft tube corresponds to the lower end of the circumference thereof, and the distance 9 between this end of circumference and the bottom 7 of the fermentor is required to be at least equivalent to about half the diameter of the draft tube 2 — preferably one-half to three-halves; in the case where it is less than one-half, the gas-liquid separating zone 6 becomes too narrow and a sufficient gas-liquid separation tends to be infeasible, while in the case where it is more than three-halves, though the gas-liquid separation is effected sufficiently, the enlargement of the fermentor 1 necessitated thereby does not necessarily result in the enhancement the effective of utilization of the fermentor, so that it is not economical. Not only that, an increase in the capacity of anaerobic portion more than needed is likely to promote the growth of unfavourable microbes. The cultivated liquid made to pass the gas-liquid separating zone 8 comes out through the nozzle 11 for drawing out the liquid to flow through the pipe 12 and is led into the heat exchanger 13 by means of a conventional centrifugal circulating pump 10 to be subjected to exchange the heat for cooling. The cultivated liquid thus cooled flows through the pipe 14 and is circulated into the fermentor 1 through the nozzle for returning liquid 15. In the case of operation employing a continuous system, it is possible to draw a part of the cultivated liquid out of the system through the pipe 16 and it is also possible to install a separate nozzle 17 for drawing out the liquid on the fermentor proper. The present apparatus is, as stated above, applicable to both the batch operation and the continuous operation. In this context, the reference numeral 18 in the drawing denotes the outlet for gas.

As will be understood from the above description, the apparatus according to the present invention is devised to cultivate micro-organisms by employing a bubble column fermentor consisting of the fermentor 1 having the draft tube 2 incorporated therein at a specified location, disposing the gas-distributor 5 constituting the inlet for the oxygen-containing gas at a specific place within said fermentor, expediting the gas-liquid separation by forming deliberately the gas-liquid separating zone 8 for the cultivated liquid below the gas-distributor 5, reducing extremely the content of foams in the cultivated liquid in the vicinity of the bottom of fermentor within the gas-liquid separating zone 8, drawing the cultivated liquid thus treated out of the fermentor 1 for cooling and circulating the thus cooled cultivated liquid again into the fermentor 1. In order to effect aerobic cultivation of micro-organisms by employing the apparatus under the present invention, the medium is fed into the fermentor through the inlet for medium 3 and then oxygen, an oxygen-containing gas, air or the like is dispersed in the cultivated liquid through the gas-distributor 5, as stated in the foregoing. The pattern of the flow of the cultivated liquid 4 is as shown by the arrows in the drawing. As a result, there is formed a gas-liquid separating zone 8 below the gas-distributor 5, whereby the gas-liquid separation is expedited, and the cultivated liquid having an elevated temperature is drawn out of the nozzle 11 and is introduced into the heat exchanger 13 by means of the centrifugal pump 10. This cultivated liquid drawn out of the fermentor 1 is low in the bubble-containing ratio, so that there is no need of employing any special circulating devices such as the displacement pump like gear pump, rotary pump, vane pump, etc. or the injector, but it is possible to perform the circulation of liquid sufficiently by the use of a conventional centrifugal pump. Provision of such equipment as a defoamer, foam breaker, etc. is of course unnecessary. The cultivated liquid cooled by the heat exchanger 13 is circulated into the fermentor 1 through the nozzle for returning liquid 15.

According to the apparatus according to the present invention, the suppression of foam can be easily performed and the removal of the heat of cultivation can also be performed efficiently by the heat exchanger installed outside the fermentor. Besides, it has an advantage that the pipe for use in effecting the cooling of the liquid outside the fermentor suffices to be of small diameter because the content of foams in the cultivated liquid is extremely small, so that it is not only economical but also capable of minimizing the chance of unfavourable microbes getting contaminated with said liquid. The special merit of the present invention lies in that it has been so devised as to make it possible to perform the cooling of the cultivated liquid outside the fermentor on an industrial scale, and as a result, adoption of a large-sized bubble column fermentor with draft tube is feasible, simplification of the apparatus is possible, occurrence of troubles during operation is minimized and, even in case of the apparatus getting out of order, it is easy to repair.

DESCRIPTION OF THE PREFERRED EMBODIMENTS

Example 1

There was employed a bubble column fermentor with draft tube having a colum diameter of 50 cm, a colum height of 500 cm, a draft tube length of 365 cm and a distance between the lower end of the draft tube and the bottom of column and a distance between the position of the gas-blowing nozzle and the bottom of column both of 35 cm, 780 l of a culture medium was stocked in the fermentor. The yeast applied was *Candida tropicalis*, and the cell concentration was 0.2 wt.%. By blowing a specified amount of air in the column under a blow pressure of about 0.1 Kg/cm$^2$.G through the gas-distributor, cultivation was started while circulating the liquid. In order to maintain the temperature at 32°C during the cultivation, the liquid was continuously drawn out of the bottom of column and was returned to the fermentor through the heat exchanger. The operation progressed very smoothly until completion of the cultivation. It was confirmed that the overall mean apparent density of the gas-liquid mixture within the column was 0.65 Kg/l and the mean apparent density at the outlet for cultivated liquid was more than 0.9 Kg/l (the ratio of bubbles contained in the liquid drawn out was less than 10%).

Examples 2–4 and Comparative Example

By employing the same apparatus as in Example 1 (save for a partial modification of the draft tube) and through the same procedures as described in Example 1, cultivation of micro-organisms was conducted. The result was as shown in the following table, which verified that the distance between the lowermost end of the draft tube and the bottom of the fermentor (i.e., the bottom of column) and the position of the gas-distributor have a great influence upon the bubble-containing ratio of the cultivated liquid drawn out of the fermentor.

wardly, the upper and lower ends of said draft tube being spaced from the top and bottom of said fermentation vessel, respectively, the vertical distance between the lower end of said draft tube and said bottom of said vessel being in the range of from 0.5 to 1.5 times the diameter of said draft tube; an inlet for oxygen-containing gas disposed inside said vessel below said draft tube for directing said gas upwardly into said draft tube, said gas inlet being disposed at a vertical position in the upper one-third of the space between the lower end of said draft tube and the bottom of said vessed so that at least the lower two-thirds of said space forms a gas-liquid separating zone below said gas inlet whereby gas bubbles are able to escape upwardly from the gas-liquid separating zone so that the cultivation liquid removed from said first discharge contains a reduced amount of gas; pumping means located outside of said vessel for removing cultivation liquid from said vessel through said first discharge; heat exchange means located outside of said vessel and connected to said pumping means for cooling the cultivation liquid fed by said pumping means; and conduit means extending from said heat exchanger for recirculating the cooled cultivation liquid into the upper part of said vessel.

2. An aerobic fermentation apparatus as claimed in

|  | diameter of column (cm) | diameter of draft tube (cm) | distance between the lowermost end of draft tube and the bottom of column (cm) | distance between the lowermost end of draft tube and the gas-distributor (cm) | bubble-containing ratio (%) |
|---|---|---|---|---|---|
| Example of |  |  |  |  |  |
| present invention 2 | 50 | 35 | 25 | 0 | 9 |
| present invention 3 | 50 | 26 | 35 | 10 | 8 |
| present invention 4 | 50 | 35 | 35 | 3 | 5 |
| Comparative |  |  |  |  |  |
| Example 1 | 50 | 35 | 15 | 0 | 35 |
| Example 2 | 50 | 35 | 25 | 22 | 30 |
| Example 3 | 50 | 35 | 35 | 28 | 32 |
| Example 4 | 50 | 26 | 25 | 12 | 31 |
| Example 5* | 50 | 22 | 35 | 3 | 7 |

*In Comparative Example 5, the distance between the lowermost end of the draft tube and the bottom of the fermentor was so long that the efficiency of the fermentor was poor.

What is claimed is:

1. An apparatus for the aerobic cultivation of a micro-organism, comprising: a fermentation vessel having a first discharge at the bottom thereof for discharging defoamed cultivation liquid from the vessel, a second discharge adjacent the upper end thereof for discharging gas from the vessel and inlet means for feeding cultivation liquid thereinto; a draft tube within said fermentation vessel, spaced from the internal wall thereof and defining therewith a first zone between said internal wall and said draft tube through which the cultivation liquid flows downwardly, said draft tube defining therewithin a second zone through which the cultivation liquid and an oxygen-containing gas flow upclaim 1, in which said pumping means is a centrifugal pump.

3. An aerobic fermentation apparatus as claimed in claim 1 wherein said gas-liquid separating zone is open and unobstructed.

4. An aerobic fermentation apparatus as claimed in claim 1 wherein said conduit means has a valved branch conduit for removing a portion of the cultivation liquid from the system.

5. An aerobic fermentation apparatus as claimed in claim 1, including a nozzle for removing cultivation liquid from the vessel at a location close to the lower end of said first zone.

* * * * *